United States Patent [19]
Christiansen

[11] Patent Number: 5,961,614
[45] Date of Patent: Oct. 5, 1999

[54] SYSTEM FOR DATA TRANSFER THROUGH AN I/O DEVICE USING A MEMORY ACCESS CONTROLLER WHICH RECEIVES AND STORES INDICATION OF A DATA STATUS SIGNAL

[75] Inventor: Kevin M. Christiansen, Saratoga, Calif.

[73] Assignee: Apple Computer, Inc., Cupertino, Calif.

[21] Appl. No.: 08/647,451

[22] Filed: May 7, 1996

Related U.S. Application Data

[63] Continuation-in-part of application No. 08/436,969, May 8, 1995, abandoned.

[51] Int. Cl.[6] .................................................. G06F 13/28
[52] U.S. Cl. .............................. 710/22; 710/17; 710/19
[58] Field of Search ........................... 348/385; 371/57.1; 395/200.62, 826, 842, 845, 115, 183.2; 607/30; 364/239.51; 370/445; 710/6, 22, 24; 714/5

[56] References Cited

U.S. PATENT DOCUMENTS

| | | | |
|---|---|---|---|
| 4,680,755 | 7/1987 | Reames | 370/451 |
| 4,700,358 | 10/1987 | Duncanson et al. | 375/222 |
| 4,757,446 | 7/1988 | Trottier et al. | 395/200.62 |
| 4,942,515 | 7/1990 | Marzucco et al. | 395/842 |
| 4,989,113 | 1/1991 | Hull, Jr. et al. | 395/842 |
| 5,136,580 | 8/1992 | Videlock et al. | 370/403 |
| 5,247,517 | 9/1993 | Ross et al. | 370/452 |
| 5,247,626 | 9/1993 | Firoozmand | 395/200.42 |
| 5,361,372 | 11/1994 | Rege et al. | 395/200.64 |
| 5,379,381 | 1/1995 | Lamb | 395/826 |
| 5,400,326 | 3/1995 | Smith | 370/401 |
| 5,434,872 | 7/1995 | Petersen et al. | 371/57.1 |
| 5,457,681 | 10/1995 | Gaddis et al. | 370/402 |
| 5,488,724 | 1/1996 | Firoozmand | 395/200.64 |
| 5,513,320 | 4/1996 | Young et al. | 395/200.66 |
| 5,528,587 | 6/1996 | Galand et al. | 370/412 |
| 5,537,413 | 7/1996 | Yang et al. | 370/456 |
| 5,568,608 | 10/1996 | Shannon | 395/183.2 |
| 5,611,046 | 3/1997 | Russell et al. | 395/115 |
| 5,612,742 | 3/1997 | Krause et al. | 348/385 |
| 5,625,842 | 4/1997 | Dalrymple | 395/842 |
| 5,696,989 | 12/1997 | Miura et al. | 395/844 |
| 5,720,770 | 2/1998 | Nappholz et al. | 607/30 |
| 5,732,094 | 3/1998 | Petersen et al. | 371/57.1 |

*Primary Examiner*—Thomas C. Lee
*Assistant Examiner*—Chien Yuan
*Attorney, Agent, or Firm*—Burns, Doane, Swecker & Mathis, L.L.P.

[57] ABSTRACT

A method and system for transferring units of data between a computer memory and an external system in which a DMA controller stores and uses information from an I/O device interfacing with the external system to transfer data more efficiently.

10 Claims, 7 Drawing Sheets

| BIT | MEANING |
|---|---|
| $S_7$ | ERROR |
| $S_6$ | NOT IMPLEMENTED |
| $S_5$ | MACE INTERRUPT |
| $S_4 ... S_1$ | NOT IMPLEMENTED |
| $S_0$ | WAIT (EXTERNALLY CONTROLLED) |

*FIG. 7*

| BIT | MEANING |
|---|---|
| $S_7$ | NOT IMPLEMENTED |
| $S_6$ | EOP (END OF PACKET) |
| $S_5 ... S_1$ | NOT IMPLEMENTED |
| $S_0$ | WAIT (EXTERNALLY CONTROLLED) |

*FIG. 9*

SYSTEM FOR DATA TRANSFER THROUGH AN I/O DEVICE USING A MEMORY ACCESS CONTROLLER WHICH RECEIVES AND STORES INDICATION OF A DATA STATUS SIGNAL

RELATED APPLICATIONS

This application is a continuation-in-part of U.S. Application No. 08/436,969, filed May 8, 1995, and entitled "Communication Interface with Improved Packet Transfer, now abandoned."

FIELD

The present invention relates to a method of and apparatus for using the status bits of a channel status register of a direct memory access (DMA) channel to control channel operation. It more particularly relates to the use of status bits to indicate when an external device has completed a data transmission and to indicate an end of a received data packet.

BACKGROUND

DMA channels transfer data to and from main system memory with minimal burden on the system CPU. Each channel controls itself and any attached I/O devices by executing instructions called channel commands. Channel commands are organized into very simple programs called channel programs, also referred to as a "buffer descriptor list" in a descriptor based DMA system such as the DBDMA system created by Apple Computer, Inc., the assignee of the present application.

A DMA engine or controller may control operation of one or more channels. The DMA controller may contain one register file which stores the current channel program pointers for each channel, and another register file which contains the current context (address, count, and flags) for each of the channels. An example of such an implementation is the Apple Grand Central I/O Controller which services eleven DMA channels.

The function of the DMA controller is to arbitrate data transfer requests from various I/O devices in the system. These devices may operate only in slave mode DMA, that is, they may make requests which indicate that they have data in receive registers which is available to be received by the system, or that they have space available in transmission registers for data to be sent by the system. Also, the I/O device may indicate that either a transmit or receive operation is complete by the generation of status information such as an interrupt which would normally require the attention of host processor.

It would be beneficial to have a DMA controller which could handle data and status information without calling on the host processor. In particular, it would be useful to have a DMA controller which is able to process multiple complete transmit or receive operations without calling on the host processor.

SUMMARY

It is an object of the present invention to overcome the deficiencies of the prior art by using status bits to facilitate the transfer and efficient storage of packets of data.

This object is achieved through the provision of a method of transferring a data unit between a computer system memory and an external system through an I/O device using a memory access controller where the memory access controller includes a register for storing status information which the memory access controller uses to control its own operation. A "data unit" is a discrete grouping of data such as would normally be transferred all at a time, such as a package of data in an Ethernet application. The memory access controller together with the I/O device transfer the data unit between the computer system memory and the external system. This may be a transmit operation in which the data unit is sent from the memory to the external system, or a receive operation in which the data unit is received from the external system. Upon completion of the operation, the I/O device sends a data status signal to the memory access controller. The memory access controller then stores an indication of the data status signal.

More specifically, in the case of an example of a data transmit operation, the memory access controller retrieves the data unit from the computer system memory and transmits the data unit to the I/O device. The I/O device then transmits the data unit to the external system, and, upon successful completion of this task, sends the data status signal which indicates a successful transmission of data unit to the external system by the I/O device. The memory access controller stores an indication of the data status signal by setting a bit in its channel status register. The memory access controller waits until the bit reflects a value of the data status signal indicating successful transmission of a data unit to the external system before taking additional action such as requesting status information or sending another data unit.

In the case of an example of a receive operation, the I/O device transmits the data unit as received from the external system to the memory access controller. It then sends a data status signal indicating forwarding of an end of the data unit from the external system. In response, the memory access controller sets a bit in its channel status register and requests data unit information form the I/O device. The memory access controller then appends the data unit information to the end of the received data unit. This permits flexible storage.

The external system may be a network and the I/O device may be an Ethernet controller, in which case the data unit corresponds to a data packet. The data status signal is preferably an interrupt signal.

In one particular embodiment, the memory access controller is a DMA channel controller, and there are two DMA channels, a receive channel and a transmit channel, with the interrupt from the receive channel being masked.

In the case of a receive operation, the data status signal may be an end-of-packet signal. The data unit is stored in at least one of a plurality of buffers allocated in the system memory with each of the plurality of buffers being smaller than a maximum data unit size. The data unit information preferably comprises a plurality of status bytes.

In another aspect, a computer system embodying the invention preferably includes a computer system memory and an I/O device connected to an external system to transfer data units between the computer system memory and an external system. The I/O device including a data status signal generator generates a data status signal upon completion of transfer of a data unit. A memory access controller connected to the computer system memory and the I/O device includes a register for storing status information which the memory access controller uses to control its own operation. The memory access controller receives the data status signal and stores an indication of a value of the data status signal in the register. In a transmit operation, the data status signal indicates a successful transmission of data unit to the external system by the 1/O device. During a data receiving operation the I/O device transmits the data unit received from the external system to the memory access controller. The data memory access controller uses the data status signal to append data unit information to the end of the data unit.

BRIEF DESCRIPTION OF THE DRAWINGS

The accompanying drawings, with are incorporated in and constitute a part of the specification, schematically illustrate a preferred embodiment of the present invention and, together with the general description given above and the detailed description of the preferred embodiment given below, serve to explain the principles of the present invention, in which:

FIG. 7 illustrates designations of Ethernet transmit channel status bits according to one embodiment of the present invention;

FIG. 9 illustrates designations of Ethernet receive channel status bits according to one embodiment of the present invention.

DETAILED DESCRIPTION

Figure 1:
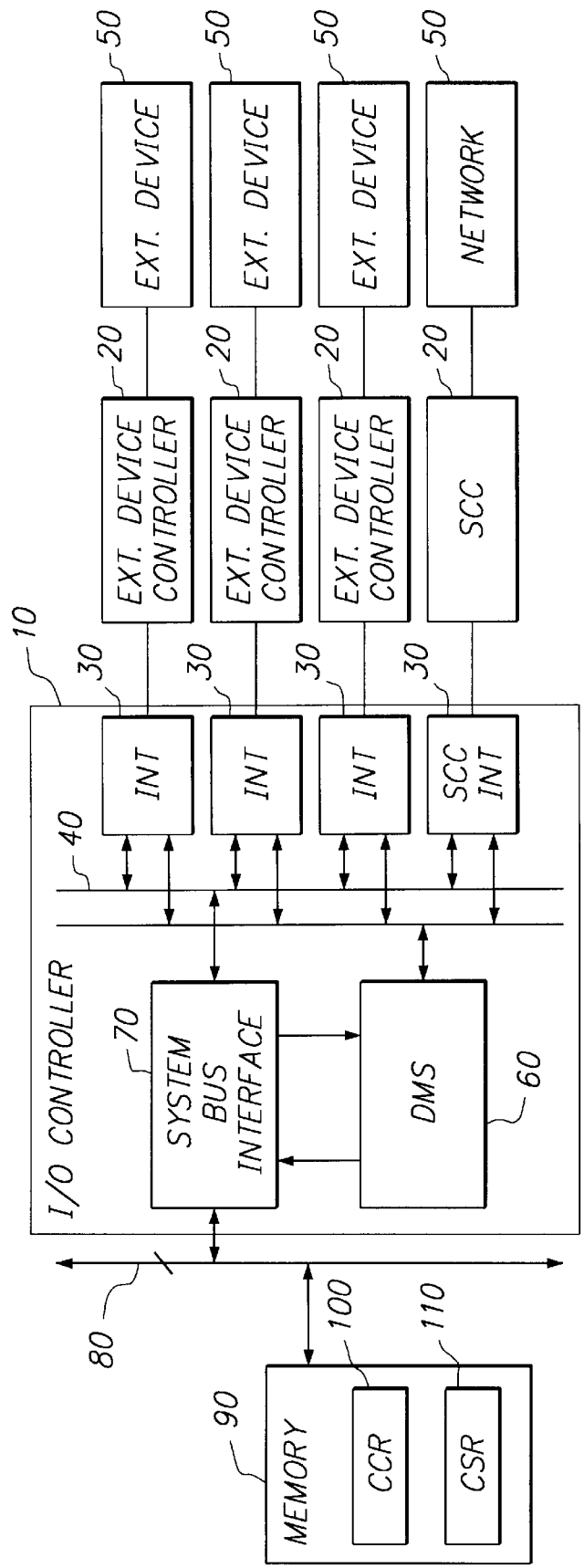
FIG. 1 is a functional block diagram of a computer system according to one embodiment of the present invention.

FIG. 1 illustrates an integrated I/O controller 10 in a system according to one embodiment of the present invention. A plurality of I/O devices or external device controllers 20 are connected through a plurality of interfaces 30 to a bus 40 within the I/O controller 10. Each I/O device is in turn connected to an external device system.50. The I/O controller 10 also contains a DMA engine 60 and a bus interface 70 which are used to control the flow of data from the I/O devices 20 out onto an external system bus 80 where the data can be stored in a memory 90 or used by other devices. A DMA controller is more completely described in U.S. patent application Nos. 08/340,248 and 08/340,249, both of which are incorporated herein by reference.

Figure 2:
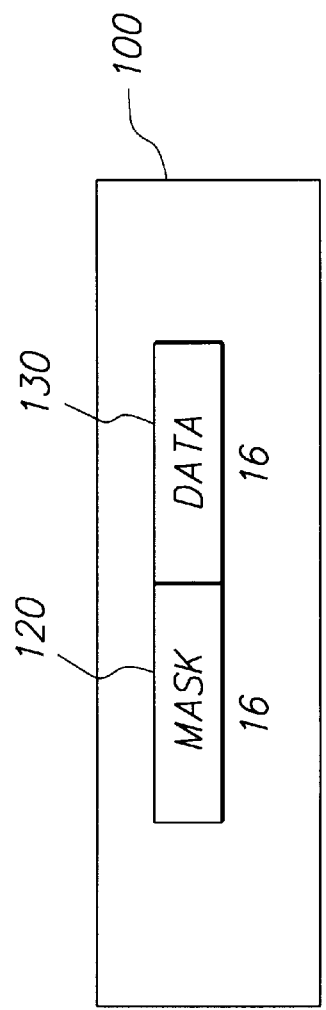
FIG. 2 illustrates organization of information in a channel control register according to one embodiment of the present invention.

The I/O controller 10 includes a channel control register 100 and a channel status register 110 which are mapped onto system memory 90. The channel control register 100 contains bits which control the operational state of the DMA channel. One organization scheme for the information stored in the channel control register 100 is illustrated in FIG. 2. As can be seen, the channel control register 100 is divided into two fields: a mask field 120 and a data field 130. The mask field 120 selects which of the bits in the data field 130 are modified by a write operation.

Figure 3:
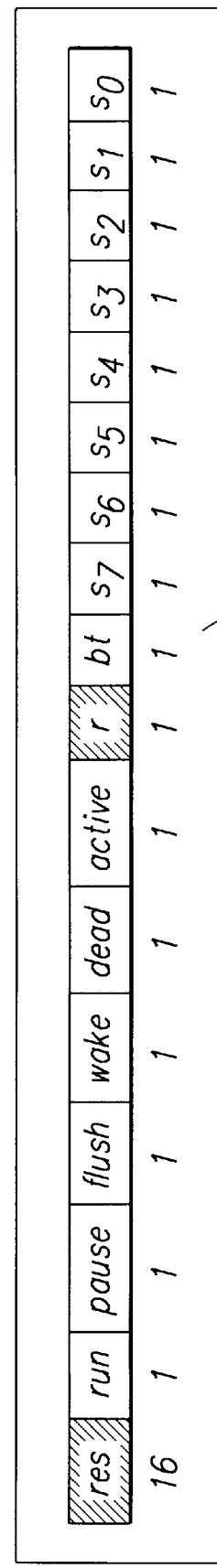
FIG. 3 illustrates organization of information in a channel status register according to one embodiment of the present invention.

The channel status register 110 is illustrated in FIG. 3. It provides access to the DMA channel's internal status bits. In other words, the eight general purpose status bits are written through the channel control register and read through the channel status register. The bits s7–s0 can be used for general purpose status operations. DMA tests these bits after the completion of each channel command to determine if various actions should be taken by the DMA channel. These status bits thus can be used for general purpose status and control. Their meaning may be channel specific, and they can be controlled either by hardware or software. They may effect conditional interrupt, branch, and wait conditions.

In the present invention, one or more of the I/O devices 20 is capable of sending status information back to the I/O controller 10. This will now be discussed for the example where the I/O device 20 is an Ethernet controller. It will be understood by one of ordinary skill in the art, however, that the invention may be embodied in connection with other I/O devices.

Figure 4:
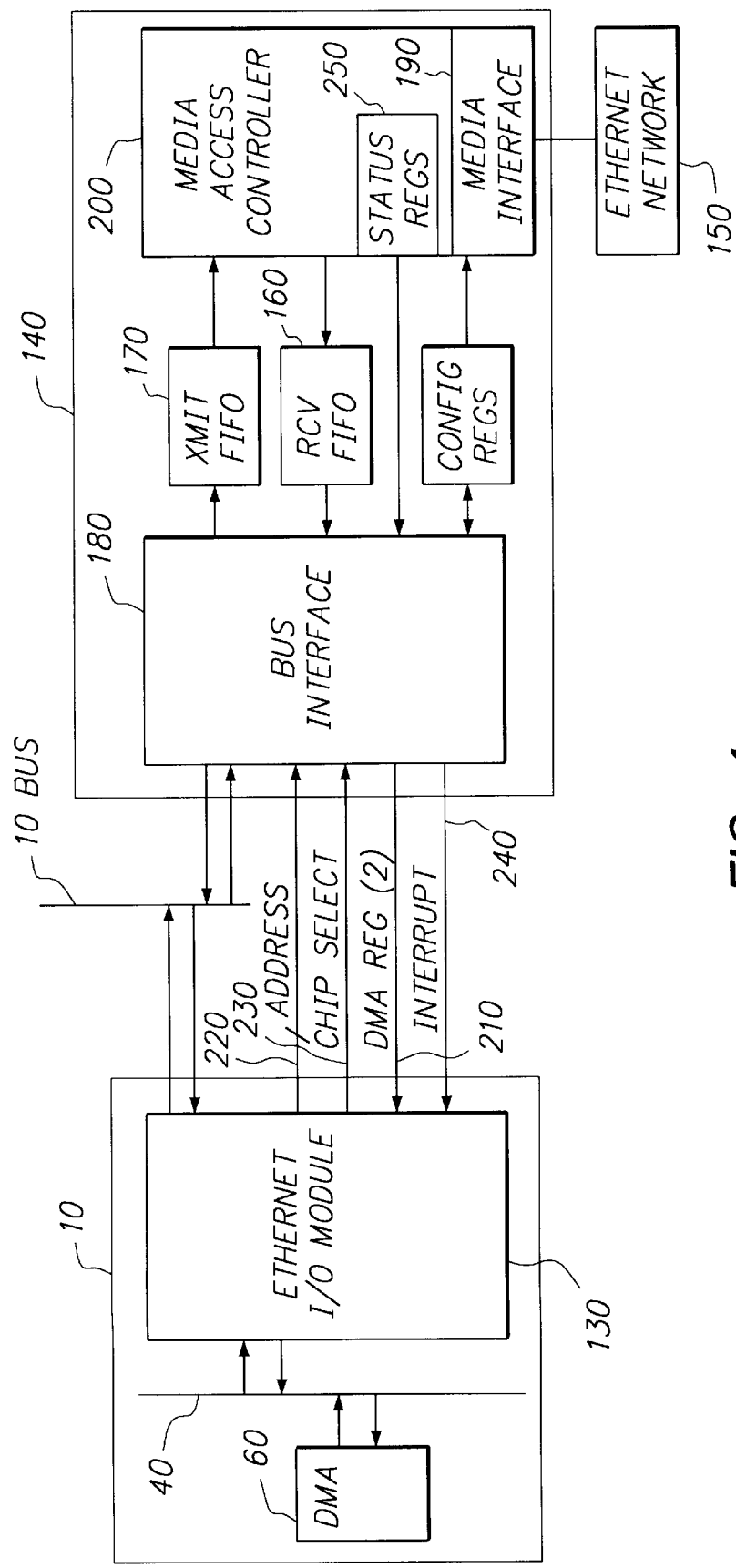
FIG. 4 is a functional block diagram of an I/O controller used with an Ethernet controller in accordance with one embodiment of the present invention.

Turning to FIG. 4, a system is disclosed wherein one of the I/O interfaces is embodied as an Ethernet I/O module 130, and wherein one of the I/O devices is embodied as an Ethernet controller 140 which connects to an external Ethernet network 150. The Ethernet controller 140 performs all of the low-level protocol handling and provides first-in first-out (FIFO) memory for data buffers in the form of a receive FIFO 160 and a transmit FIFO 170. The Ethernet controller 140 has a slave mode DMA interface 180, with separate request lines for transmit and receive.

When there is space to put additional data in the transmit FIFO 170, the Ethernet controller 140 asserts a DMA request. Similarly, the Ethernet controller 140 asserts a receive DMA request when data is available in the receive FIFO 160.

The Ethernet controller 140 is a register based peripheral. It is configured using simple memory mapped I/O read or write commands. From a software standpoint, the Ethernet controller 140 operates as a data conduit to and from the Ethernet network 150 through a register based function program, DMA data movement, and interrupt driven event handling.

As mentioned, the Ethernet controller 140 is connected to the I/O controller 10 through an Ethernet I/O module 130. (Additional elements within the I/O controller 10 are the same as those shown in FIG. 1 and are omitted from FIG. 4 for clarity.) The Ethernet controller 140 is also connected to an external media network 150 through a media interface 190 in a media access controller 200. The media access controller 200 moves data to the receive FIFO 160 and the transmit FIFO 170. The Ethernet controller 140 communicates with the Ethernet I/O module 130 over DMA request lines 210, address lines 220, a chip select line 230, and an interrupt line 240.

The Ethernet I/O module 130 in the I/O controller 10 provides the necessary interfaces to the Ethernet controller 140. When the host accesses the Ethernet controller 140 registers using memory mapped reads or writes, the Ethernet I/O module 130 performs the read or write cycle directly with the Ethernet controller 140.

The I/O controller 10 has two DMA channels for Ethernet: a receive channel and a transmit channel. During Ethernet receive and transmit DMA operations, the Ethernet I/O module 130 moves data in and out of the Ethernet controller 140's FIFOs 160 and 170, respectively, and retrieves the status information from the Ethernet controller 140 after DMA is completed. The DMA request from the Ethernet controller 140 along with an active running DMA channel command triggers a DMA transfer.

Figure 5:
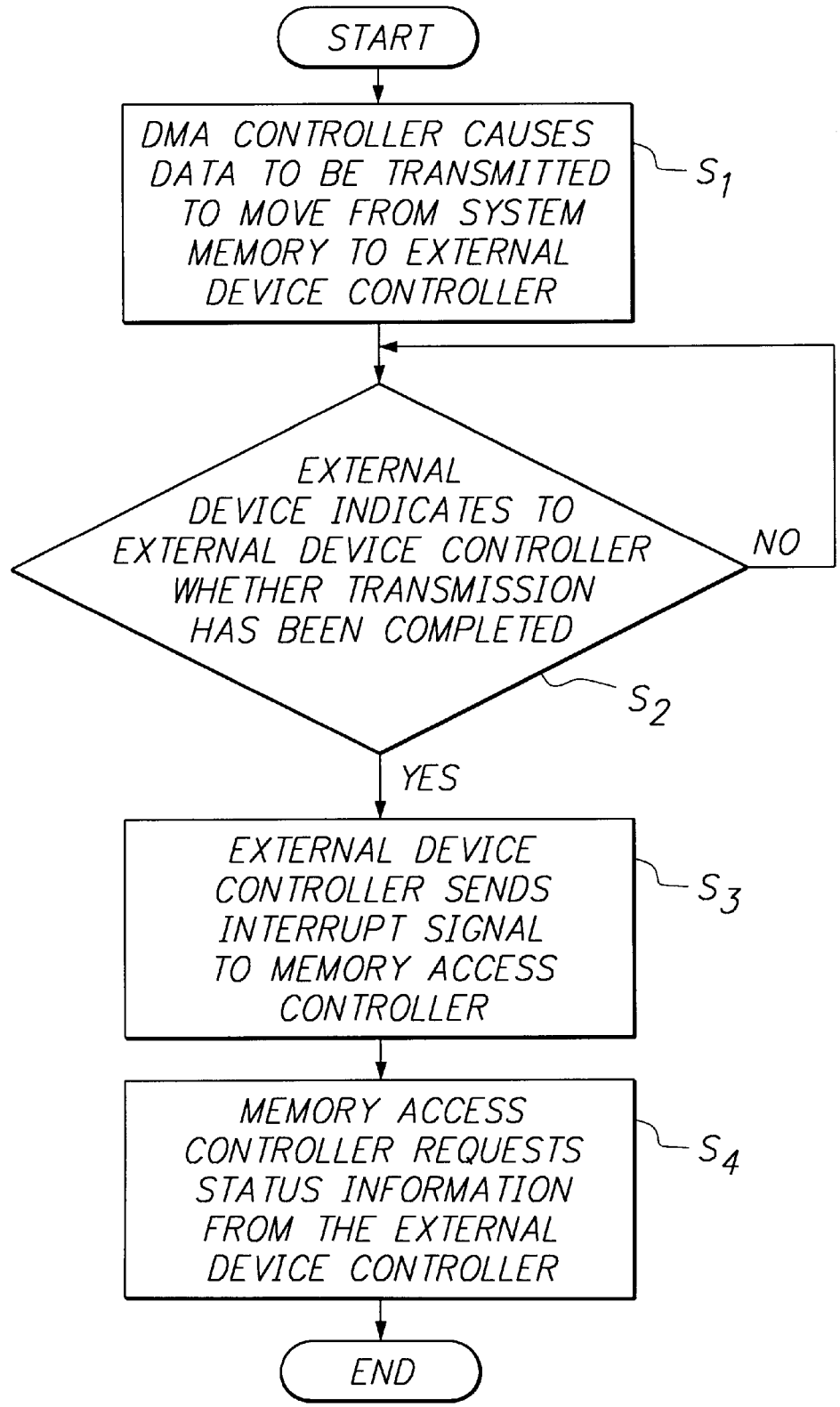
FIG. 5 is a flowchart illustrating the operation of an Ethernet transmit channel according to a presently preferred embodiment of the invention.
Figure 6:
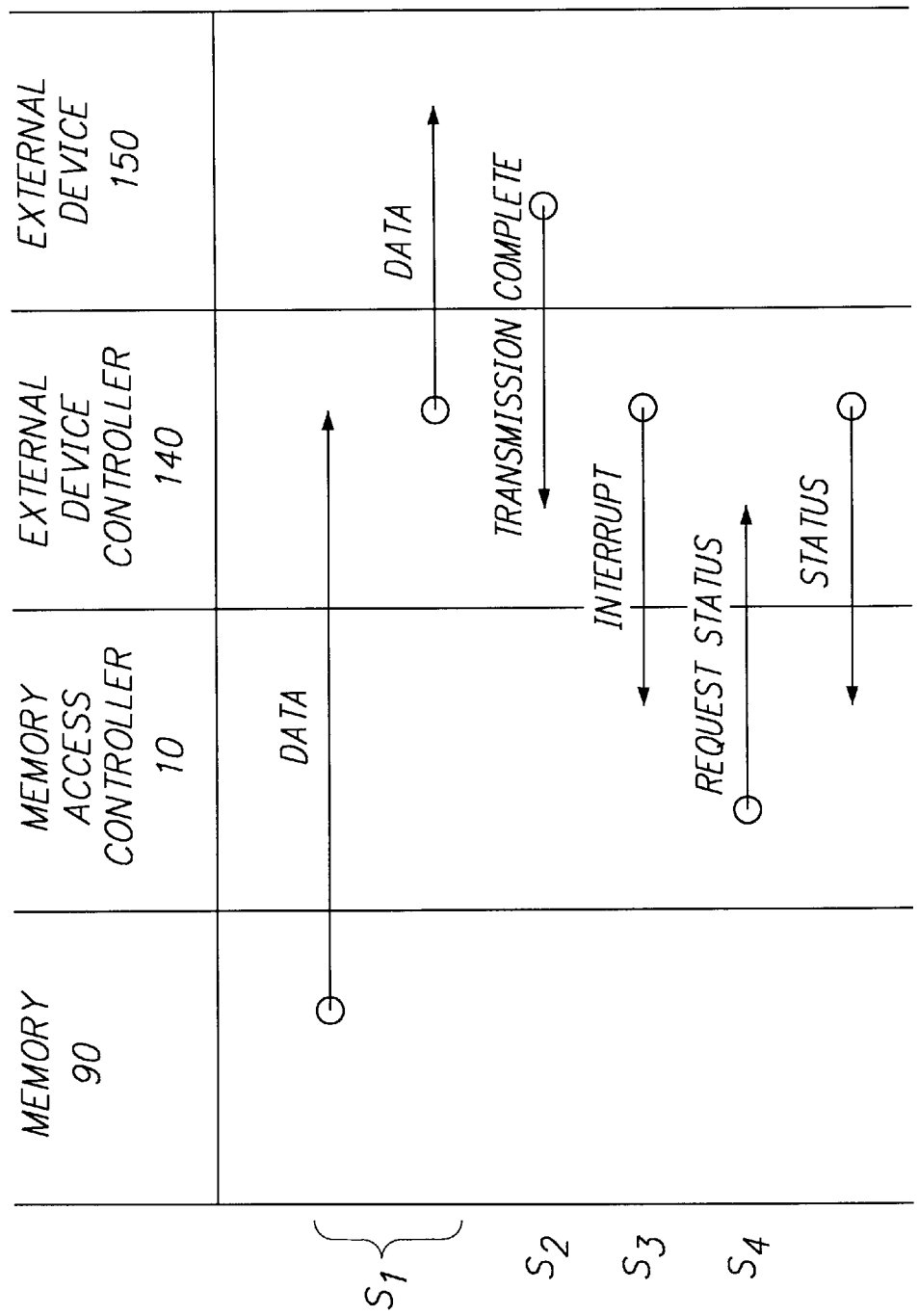
FIG. 6 is a chart illustrating operation of an an Ethernet transmit channel according to a presently preferred embodiment of the invention.

A process for transmitting data packets from the system memory to an external device such as the Ethernet controller 24 will now be described with reference to FIGS. 4, 5, and 6. In step S1 in FIG. 5, the memory access controller, which in the example is I/O controller 10, transfers a data unit in the form of one or more data packets from the memory 90 (see FIG. 1) to an I/O device, labelled an external device controller, e.g., Ethernet controller 140. This is also shown graphically in FIG. 6. The external device controller 140 then sends the data unit to the external system 150 Specifically, the memory access controller 10 transfers the data unit to the bus interface 180 which transfers the data packets to the transmit FIFO buffer 170. The I/O device controller 140 then transmits the data unit to the external system 150. In step S2, the I/O device controller 140 waits to receive an indication from the external system 150 that the data unit has been successfully transmitted. After the I/O device controller 140 has received the indication from the external system 150, in step S3, it sends an interrupt signal over interrupt line 240 to the memory access controller 10. In the specific embodiment depicted, the media access controller 200 sets its status registers 250 to a setting that indicates that the complete packet was sent.

The interrupt signal causes a bit to be set in the memory access controller 10's channel status register 110 which, in the example shown in FIG. 3, is bit s5, thus storing an indication of receipt of the interrupt signal. This information can then be used to control subsequent operation of the memory access controller 10. For example, the memory access controller can be in a wait condition until the status bit is set, which will cause the memory access controller to execute a next instruction. Also, as shown in step S4, it can be used to prompt the memory access controller 10 to request status information from the status registers 250, which the external device controller then provides. The process can be repeated to transmit another packet before the channel goes idle. Assuming normal operation, the system processor does not need to be interrupted until the last packet has been sent.

The Ethernet controller 140 will also produce an interrupt signal if an error occurs during transmission.

One example of how the bits s7–s0 can be arranged in the channel status register 110 is illustrated in FIG. 7, wherein only the bits s7, s5, and sO may be asserted to generate actions by the DMA channel. In this example, the DMA controller 60 interprets the set status bit to means that the packet was transmitted by the Ethernet controller 140. As a result, the I/O controller 10 reads the status information stored in the status registers 250. It will be appreciated by one skilled in the art that the interrupt signal can also be transmitted only after the completion of the last data packet in a data stream.

Figure 8:
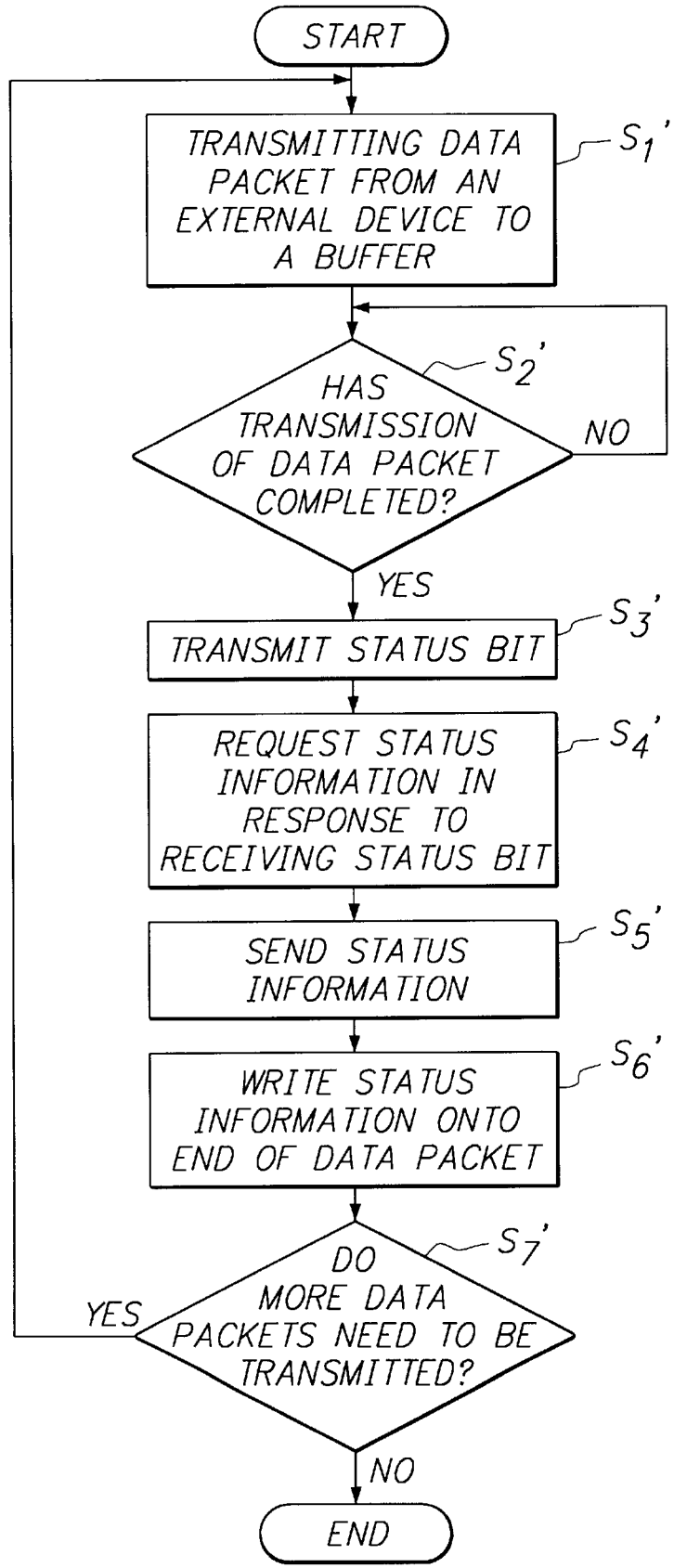
FIG. 8 is a flowchart illustrating the operation of the Ethernet receive channel.

The operation of an exemplary Ethernet receive channel is illustrated in FIG. 8. In step S1', data packets are being written into a system memory 90 from an external device 150. When the Ethernet controller 140 determines that data packet transmission to the I/O controller 10 has been completed (step S2'), the Ethernet controller 140 sets the status register 250 to indicate the status of the packet that was just transmitted and generates an interrupt signal as a status bit in step S3'. One example of how the status bits can be arranged for the receive channel status register is illustrated in FIG. 9. In this embodiment of the present invention, the status bit s6 indicates that the packet has been sent. By tying the interrupt signal to the s6 bit of the receive channel status register, the interrupt signal will indicate to the I/O controller 10 that the end of the packet has been received.

In response to receipt of the interrupt/status bit, the I/O controller 10 requests the status information contained in the status registers 250 in the Ethernet controller 140 in step S4'. The Ethernet controller 140 then in step S5' sends the status information (which, for example, may be four bytes) to the I/O controller 10 which writes the status information on to the end of the received packet in step S6'. Thus, the status bit s6 can be used to indicate the end of a packet, which in turn means that the buffer size can be made smaller than the maximum data packet size. This allows for a more efficient use of the available buffer space since the buffers are no longer tied to a one-to-one correspondence with the data packets.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced herein.

I claim:

1. A method of transferring a data unit from a computer system memory and to an external system through an I/O device using a memory access controller, said memory access controller including a register for storing information which the memory access controller uses to control its own operation, said method comprising the steps of:

a first step, executed by said memory access controller, of retrieving said data unit from said computer system memory and transmitting said data unit to said I/O device;

a second step, executed by said I/O device, of transmitting said data unit retrieved and transmitted in said first step to said external system;

a third step, executed by said I/O device, of sending a data status signal to said memory access controller when said second step is complete; and a fourth step, executed by said memory access controller, of storing an indication of said data status signal sent in said third step in said register.

2. A method as in claim 1 wherein said data status signal indicates a successful transmission of said data unit to said external system by said I/O device, wherein said register is a channel status register, and wherein a bit of said channel status register assumes a value indicative of receipt of said data status signal.

3. A method as claimed in claim 1 wherein said memory access controller waits until said bit reflects a value of said data status signal indicating successful transmission of a data unit to the external system before sending another data unit.

4. A method as claimed in claim 1 wherein said external system is a network, said I/O device is an Ethernet controller, and said data unit is a packet.

5. A method as claimed in claim 1 wherein said data status signal is an interrupt signal.

6. A method as claimed in claim 1 wherein said memory access controller is a DMA channel controller.

7. A method as claimed in claim 1 wherein there are two DMA channels, a receive channel and a transmit channel, and wherein an interrupt from a said receive channel is masked.

8. A computer system comprising:

a computer system memory;

an I/O device connected to an external system to transfer data units between said computer system memory and an external system; said I/O device including a data status signal generator which generates a data status signal upon completion of transfer of a data unit;

a memory access controller connected to said computer system memory and said I/O device; said memory access controller including a register for storing status information which the memory access controller uses to control its own operation, wherein said memory access controller receives said data status signal and stores an indication of a value of said data status signal in said register, wherein during a data transmit operation the memory access controller retrieves said data unit from said computer system memory and transfers said data unit to said I/O device and said I/O device transmits said data unit to said external system and wherein the said data transfer status signal is sent from the I/O device to the memory access controller after the transfer of said data unit to said I/O device.

9. A computer system as claimed in claim 8 wherein said data status signal indicates a successful transmission of a data unit to said external system by said I/O device, wherein said register is a channel status register, and wherein a bit of the channel status register is arranged to reflect a value of said data status signal.

10. A computer system as claimed in claim 9 wherein said memory access controller waits until said bit reflects a value of said data status signal indicating successful transmission of a data unit to the external system before sending another data unit.

* * * * *

UNITED STATES PATENT AND TRADEMARK OFFICE
CERTIFICATE OF CORRECTION

PATENT NO. : 5,961,614
DATED : October 5, 1999
INVENTOR(S) : Kevin M. Christiansen It is certified that error appears in the above-identified patent and that said Letters Patent is hereby corrected as shown below:

Column 6,
Line 52, after "claim", delete "1", insert --2--; and

Column 7,
Line 5, after "system", delete the semi-colon ";" , insert a comma --,--.

Signed and Sealed this

Seventh Day of August, 2001

*Attest:*

NICHOLAS P. GODICI
*Attesting Officer*     *Acting Director of the United States Patent and Trademark Office*